United States Patent
Menon et al.

(10) Patent No.: US 12,094,059 B1
(45) Date of Patent: Sep. 17, 2024

(54) ANISOTROPIC POLYHEDRA BOUNDARY LAYER ADAPTATION METHOD

(71) Applicant: ANSYS, INC., Canonsburg, PA (US)

(72) Inventors: Sandeep Menon, Chicago, IL (US); Thomas Gessner, Grantham, NH (US)

(73) Assignee: ANSYS, INC., Canonsburg, PA (US)

( * ) Notice: Subject to any disclaimer, the term of this patent is extended or adjusted under 35 U.S.C. 154(b) by 296 days.

(21) Appl. No.: 17/354,934

(22) Filed: Jun. 22, 2021

(51) Int. Cl.
*G06T 17/20* (2006.01)

(52) U.S. Cl.
CPC ........ *G06T 17/205* (2013.01); *G06T 2200/24* (2013.01)

(58) Field of Classification Search
CPC ...... B60K 2350/106; B60K 2350/1084; B60K 35/00; B60K 2350/2052; B60K 2350/352; B60K 2350/965; B60K 2350/1072; G06T 3/20; G06T 3/60; G06T 2210/62; G06T 19/006; G02B 27/0101; G02B 2027/014; G02B 2027/0198; G02B 2027/0141
See application file for complete search history.

(56) References Cited

U.S. PATENT DOCUMENTS

| | | | | |
|---|---|---|---|---|
| 10,803,661 | B1 * | 10/2020 | Menon | ................ G06F 3/04842 |
| 2017/0199303 | A1 * | 7/2017 | Brewer | ................. G01V 99/00 |
| 2017/0299770 | A1 * | 10/2017 | Brewer | ................. G01V 99/005 |
| 2018/0190013 | A1 * | 7/2018 | Wald | ..................... G06T 17/005 |
| 2018/0232950 | A1 * | 8/2018 | Brewer | ................. G06F 17/175 |

OTHER PUBLICATIONS

Jakub Červený, Non-Conforming Mesh Refinement for High-Order Finite Elements, May 2019 (Year: 2019).*
Kim, Adaptive mesh refinement in the fast lane, 2020 (Year: 2020).*

* cited by examiner

*Primary Examiner* — Phuc N Doan
(74) *Attorney, Agent, or Firm* — Womble Bond Dickinson (US) LLP

(57) ABSTRACT

Machine assisted systems and methods for anisotropic polyhedral boundary layer adaptation that provides an anisotropic refinement of polyhedral prisms are described. The method can include operations: identifying a prismatic polyhedral cell as a parent cell within a polyhedral mesh representing an object of a physical system; generating a plurality of child cells for the parent cell based on non-overlapping child faces of a side face as a parent face, wherein a pair of mid-edge nodes for the side face are connected anisotropically for a child face edge of the non-overlapping child faces, the pair of mid-edge nodes are connected between the two base edges or between the two side edges; and refining the polyhedral mesh until a refinement level or a size limit is obtained, wherein the refining the polyhedral mesh includes the identification of the prismatic polyhedral cell and the generation of the plurality of child cells.

29 Claims, 17 Drawing Sheets

ANISOTROPIC POLYHEDRA BOUNDARY LAYER ADAPTATION METHOD

BACKGROUND

Traditional mesh adaptions use isotropic refinement to split elements equally in all directions to improve the solution. This is done whether this is required for an improved solution or not, e.g., splitting elements along a certain direction for boundary layer/prismatic elements may provide no benefit, leading to a waste of computational effort during the solution process.

SUMMARY

The present disclosure describes herein an anisotropic polyhedral boundary layer adaptation method. The method provides an anisotropic refinement of polyhedral prisms that can combine with arbitrary polyhedral elements that have been isotropically refined. The method may increase mesh density along specific directions within the boundary layer of a polyhedral mesh. The refinement stencil on the side, upper, and lower faces conform to those for isotropic refinement when needed. In this manner, a seamless transition between the anisotropic and the isotropic regions in the mesh is possible. The method may also provide a mechanism to combine normal and tangent methods to achieve an isotropic refinement when required. In this implementation, standard prismatic elements may be treated as polyhedral prisms.

According to one embodiment described herein, a non-transitory machine readable medium storing executable program instructions which when executed by a data processing system causes the data processing system to perform a method. The method can include the following operations: identifying a prismatic polyhedral cell as a parent cell within a polyhedral mesh representing an object of a physical system. The prismatic polyhedral cell may have two base faces and a plurality of side faces joining the two base faces. A side face may join the two base faces via two base edges. The side face may join neighboring two of the side faces via two side edges. The method can also include the following operations: generating a plurality of child cells for the parent cell based on non-overlapping child faces of a side face as a parent face. A pair of mid-edge nodes for the side face may be connected anisotropically for a child face edge of the non-overlapping child faces. The pair of mid-edge nodes may be connected between the two base edges or between the two side edges. The method can further include the following operations: refining the polyhedral mesh until a refinement level or a size limit is obtained. The refining the polyhedral mesh may include the identification of the prismatic polyhedral cell and the generation of the plurality of child cells.

In one embodiment, the pair of mid-edge nodes may be defined based on mid-edge node locations of the side edges or mid-edge node locations of the base edges. A connection of the mid-edge node locations of the side edges and the mid-edge node locations of the base edges may correspond to an isotropic refinement of the prismatic polyhedral cell.

In one embodiment, the pair of mid-edge nodes may be connected between the two base edges. The generation of the plurality of child cells may include generating non-overlapping child faces for each respective base face as a parent face. A plurality of mid-edge nodes and a mid-face node for the respective base face may be connected isotropically for a plurality of non-overlapping child faces of the respective base face. The plurality of child cells may be generated based on the non-overlapping child faces of the respective base face.

In one embodiment, the pair of mid-edge nodes may be connected between the two side edges. The two base faces may be shared respectively by two of the plurality of child cells.

In one embodiment, the plurality of child cells and the parent cell may be related according to a cell hierarchy. The refinement may be repeated for at least two consecutive levels of the cell hierarchy.

In one embodiment, the prismatic polyhedral cell may belong to a boundary layer of the polyhedral mesh.

In one embodiment, the identification may be based on a user input indicating the boundary layer of the polyhedral mesh via a graphic user interface.

In one embodiment, the generating the plurality of child cells may include determining an orientation of the prismatic polyhedral cell relative to the boundary layer for connecting the pair of mid-edge nodes.

In one embodiment, the pair of mid-edge nodes may be connected between the base edges if the orientation indicates the base faces of the prismatic polyhedral cell and the boundary layer are substantially normally aligned.

In one embodiment, the method may also include performing a simulation using the refined polyhedral mesh.

In one embodiment, the method may further include identifying a plurality of parent cells from a hierarchy of polyhedral cells of the refined polyhedral mesh. The plurality of parent cells may be of a common level within the hierarchy. One of the plurality of parent cells may have one or more child cells within the hierarchy of polyhedral cells. The plurality of parent cells may include the two base faces and the plurality of side faces. The method may also include agglomerating the one or more child cells into the one parent cell. The prismatic polyhedral cell with the plurality of parent cells may correspond to the parent cell of the one or more child cells. The one or more child faces of the one or more child cells may be agglomerated into the one parent face. The prismatic polyhedral cell with the plurality of parent faces may correspond to the parent cell of the one or more child cells. The method may additionally include generating a coarsened polyhedral mesh including the prismatic polyhedral cell based on the refined polyhedral mesh.

In another aspect of the present disclosure, the method can include the following operations: identifying a polyhedral cell within a polyhedral mesh representing an object of a physical system. The polyhedral cell may have a face. A plurality of possible node locations in the polyhedral cell may correspond to an isotropic refinement of the polyhedral cell. The method can also include the following operations: determining an anisotropic refinement for refining the polyhedral cell anisotropically according to a normal direction or a tangent direction of the face; performing the anisotropic refinement on the polyhedral cell. Each node may be generated for performing the anisotropic refinement is assigned with a separate one of the possible node locations corresponding to the isotropic refinement of the polyhedral cell. The method can further include the following operations: refining the polyhedral mesh until a refinement level or a size limit may be obtained. The refining the polyhedral mesh may include the determining the anisotropic refinement and the performing the anisotropic refinement.

In one embodiment, the polyhedral cell may include a base upper face, a base lower face, and a plurality of side faces. The base upper and lower faces may be connected via the plurality of side faces. The base upper and lower faces may have a same number of nodes.

In one embodiment, the method may further include the following operations: identifying a mid-face node at a center of the base upper and lower faces of the face; identifying a plurality of normal mid-edge nodes on each edge of the base upper lower faces; generating a plurality of normal child cells by splitting the base upper and lower faces; identifying a plurality of tangential mid-edge nodes on each edge of the plurality of side faces; and generating a plurality of tangential child cells by splitting the plurality of side faces.

In one embodiment, the method may further include the following operations: initiating a refinement level to zero at every node on the polyhedral cell; and incrementing the refinement level each time a mid-edge node is added.

In one embodiment, the refinement level may include a normal and a tangential levels. The normal level may correspond to a refinement of the base upper and lower faces in the normal direction. The tangential level may correspond to a refinement of the plurality of side faces in the tangential direction.

In one embodiment, the method may further include the following operations: generating isotropic cells based on the plurality of normal child cells and the plurality of tangential child cells.

In a further aspect of the present disclosure, the method can include the following operations: identifying a prismatic polyhedral cell within a prismatic polyhedral mesh representing an object of a physical system. The prismatic polyhedral cell may have a parent face with an anisotropic base upper face, an anisotropic base lower face, and a plurality of anisotropic side faces. The anisotropic base upper and lower faces may be connected via the plurality of anisotropic side faces. The anisotropic base upper and lower faces may have a same number of nodes. The method can also include the following operations: refining the anisotropic base upper and lower faces in a normal direction. The refining the anisotropic base upper and lower faces in a normal direction may include the following operations: identifying a mid-face node at a center of the anisotropic base upper and lower faces of the parent face, identifying a plurality of normal mid-edge nodes on each edge of the anisotropic base upper lower faces, and generating a plurality of normal child faces by splitting the anisotropic base upper and lower faces. The method can further include the following operations: refining the plurality of side faces in a tangential direction. The refining the plurality of side faces in a tangential direction may include the following operations: identifying a plurality of tangential mid-edge nodes on each edge of the plurality of anisotropic side faces, and generating a plurality of tangential child faces by splitting the plurality of anisotropic side faces.

In one embodiment, the method may also include initiating a refinement level to zero at every node on the prismatic polyhedral cell; and incrementing the refinement level each time a mid-edge node is added.

In one embodiment, the method may further include generating isotropic cells based on the plurality of normal child cells and the plurality of tangential child cells.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Within computational fluid dynamics (CFD) simulations, objects can be modeled as meshes. Various meshing techniques exist such as tetrahedral meshing, hexahedral meshing, polyhedra meshing, and/or surface meshing. A mesh can be made up of a plurality of cells having a plurality of faces. Each face may be made up of a plurality of nodes. Refinement and coarsening can happen at the face and/or cell levels.

Figure 1A:
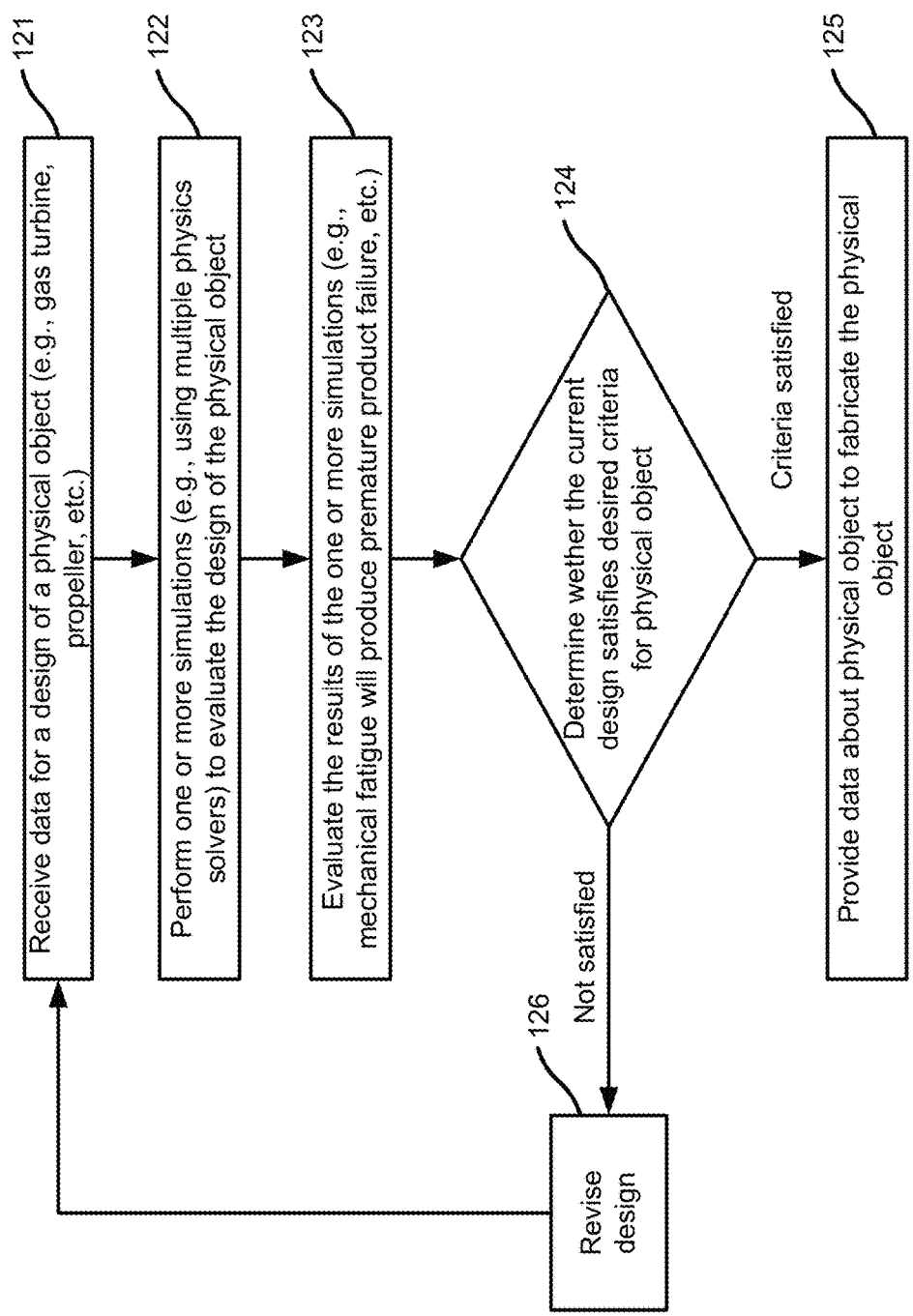
FIG. 1A shows a flowchart which illustrates a method which can be used according to one or more embodiments described herein to design or evaluate a product using a simulation system.

The embodiments described herein can be used in computer simulations of various different physical systems and physical objects (for example, rotating machinery (e.g., a blade in a gas turbine), electrification, external aerodynamics (e.g., an aircraft's wing or an automobile), heat transfer, turbomachinery, electronics manufacturing) in order to determine whether a particular design of the system or object satisfies particular requirements for the system or object. For example, there might be certain design requirements relating to aerodynamic properties and physical strength of an aircraft's wing or a blade of a gas turbine, and one physics simulation or several multiphysics simulations can be used to determine whether a particular design satisfies those design requirements. FIG. 1A shows a method in which these design requirements can be tested relative to a particular design of a system or object which is being simulated. In operation 121 of FIG. 1A, a data processing system (e.g., a computer executing simulation software to provide a simulation system) can receive data about a design for a system or object. The data can be created in computer aided design (CAD) software on a data processing system, and the data can include geometry information (e.g., sizes and shapes) about the system or object, material information about the material(s) that will be used to manufacture the system or object, and information about external forces and an environment surrounding the system or object (e.g., wind speed, temperatures, etc.). Then in operation 122, the data processing system can perform one or more physics simulations or multiphysics simulations (such as simulations using different physics solvers over different spaces in the simulations) to evaluate the design of the system or object. These physics simulations can provide physics solution data that can use the aspects and embodiments described herein. In operation 123, the designer can evaluate the results of one or more simulations to determine whether the design of the system or object satisfies certain desired criteria for the design. This determination is shown in operation 124. If the one or more criteria are satisfied, then the designer in operation 125 can provide data about the system or object to allow the fabrication or manufacture of the system or object. For example, if the one or more criteria are satisfied, a CAD file can be produced that describes how to build the system or object, and the system or object can be manufactured based on that CAD file. If the criteria are not satisfied as determined in operation 124, the designer can revise the design in operation 126 (for example, by changing sizes and/or materials used in the system or object, etc.) and repeat the process by performing additional further simulations to evaluate the redesigned system or object. This can be repeated until the desired criteria are achieved for the system or object.

Meshing technologies can be used in modeling a variety of physical phenomena, including solid mechanics, fluid flows, and/or electromagnetics. Polyhedral meshes can be particularly attractive for accurately representing various geometries being modeled, while also providing considerable flexibility with regard to mesh generation. Adaptive mesh refinement is a technique that can be used to achieve higher solution accuracy with a marginal increase of computational expense. Conventional mesh refinement algorithms, however, are limited to meshes with standard elements types such as hexahedra, tetrahedral, prisms, quadrilaterals, triangles, and pyramids. Moreover, existing algorithms utilize templates that are dependent upon a number of defined faces associated with each of the standard element types. For example, when a hexahedron having a defined number of six faces (each face having four edges) is passed into an algorithm, a standard template that can accommodate exactly four edges is applied for refinement. The templates, however, do not have the ability to refine arbitrary polyhedral meshes.

The subject matter described herein provides many technical advantages. As described herein, the computer-based techniques of the present disclosure improve the functioning of a computer system as compared to conventional approaches because the techniques described herein enable high-quality mesh generation and physical systems/objects modeling of physics designs in a manner that is more accurate and/or more efficient (e.g., faster, with smaller memory and processing requirements) as versus the conventional approaches. For example, for gas turbine combustors, the techniques described herein can refine boundary layer for Reynolds-averaged Navier-Stokes (RANS) to large-eddy simulation (LES) transition without having to generate a new mesh. Moreover, with the techniques described herein, an enhanced fidelity simulation with highly-detailed mesh can be achieved when simulating automotive external aerodynamics. A highly-detailed mesh can generate a more accurate model (e.g., CFD model geometry), allowing for a high fidelity physical simulation. Anisotropic adaption of polyhedral prisms can speed up the mesh generation of physical objects by delaying the creation of additional layers based on the solution field. The computer-based techniques achieve such improvements while alleviating the need for expensive and time consuming CFD simulations. This is enabled by adapting of anisotropic refinement of polyhedral prisms and other techniques described herein.

Figure 1B:
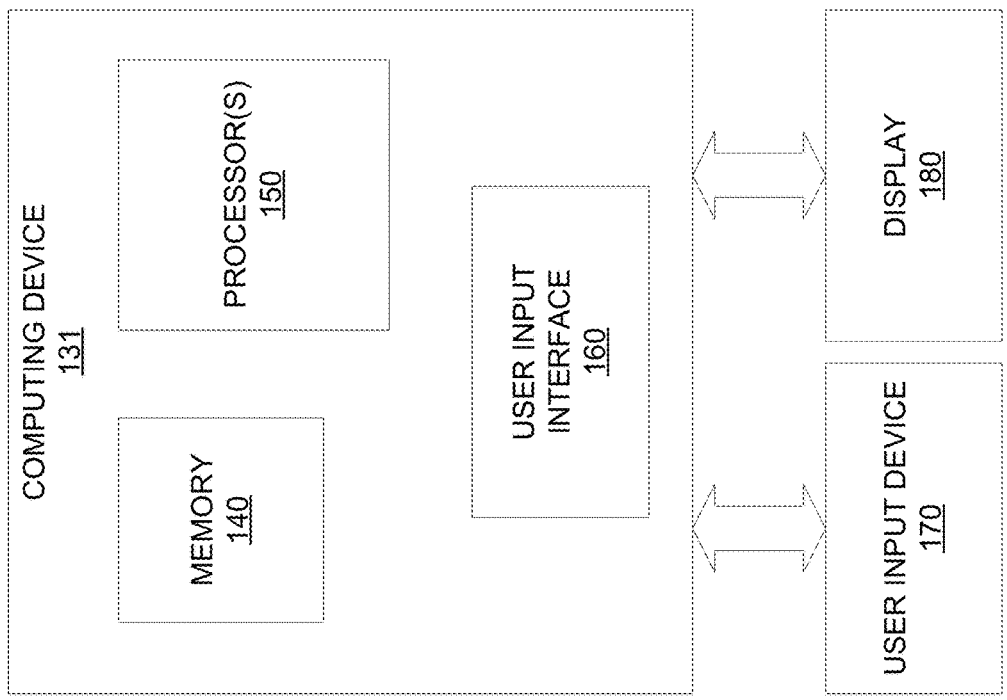
FIG. 1B shows an example diagram which illustrates an isotropic refinement according to one embodiment of the disclosure.

FIG. 1B is a block diagram of a system 130 that can implement the refining and coarsening of polyhedral meshes according to one embodiment. The system 130 can include a computing device 131. The computing device 131 can include memory 140 for storing instructions for execution by one or more data processor/processor cores 150. The computing device 131 can also include a user input interface 160 that can receive instructions provided by a user input device 170 and/or via a graphical user interface. The system 130 can optionally include a display 180 that can render visual information that corresponds to a rendered polyhedral mesh of a modeled object, and/or a polyhedral mesh having a refined plurality of polyhedral cells.

Polyhedra shapes may be significantly more difficult to refine due to their arbitrary shape. The method disclosed herein can allow a refinement of boundary layer polyhedral prisms anisotropically in tangent or normal directions. The method may also allow a seamless transition from an anisotropic refinement of polyhedral prisms to an isotropic refinement of a polyhedral cell. Additionally, the transition between the anisotropic refinement in different directions can also be handled. Further, the method may seamlessly combine isotropic refinement for polyhedral cells with the anisotropic refinement technology in a boundary layer interfacing with non-prismatic cells. The method can also handle hybrid meshes with prismatic elements and non-prismatic elements.

Figure 2A:
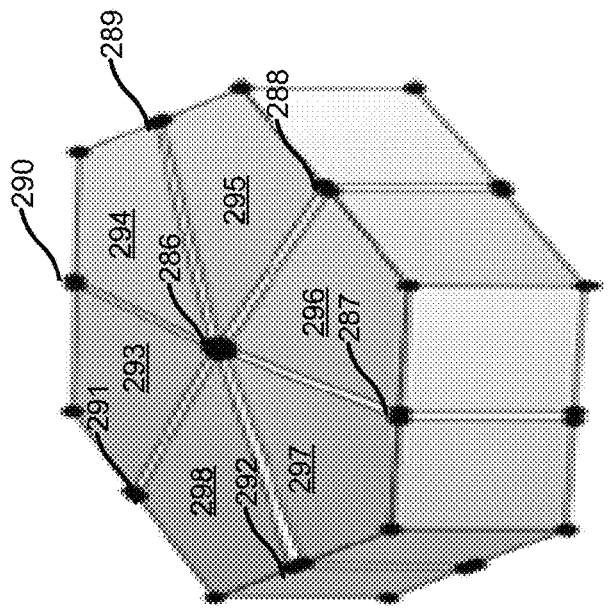
FIG. 2A shows an example diagram which illustrates one embodiment of normal refinement according to one embodiment of the disclosure.
Figure 2A:
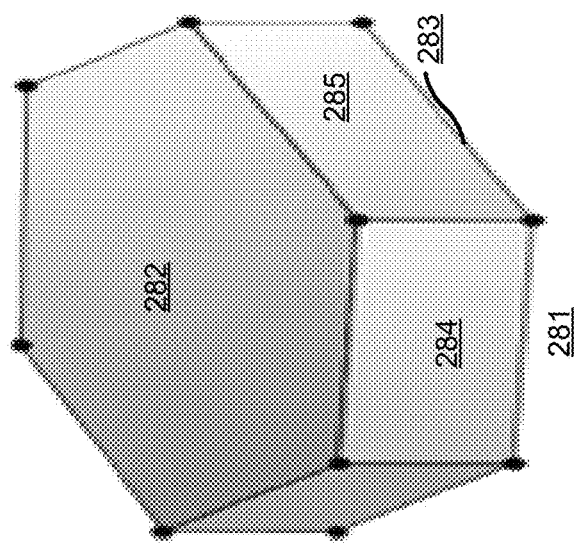
Figure 11:
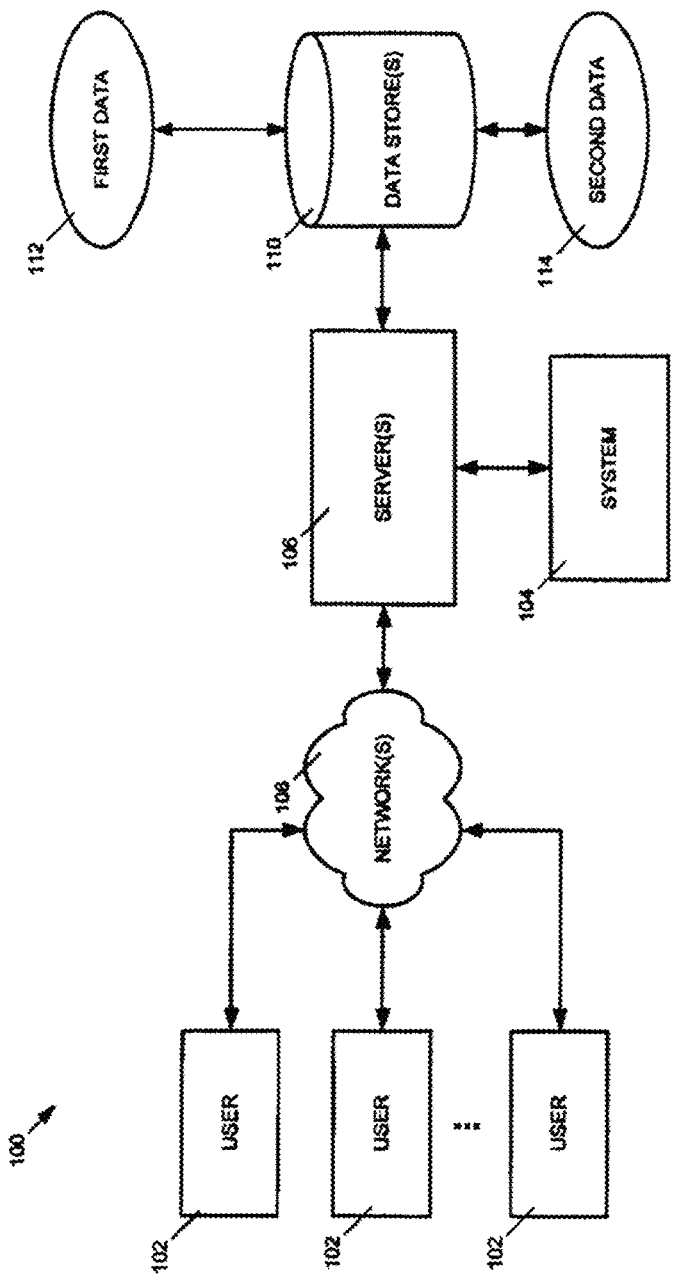
FIGS. 11, 12A-12C depict example systems which may be used in conjunction with the embodiments described herein.

FIG. 2A shows an embodiment of a normal refinement process 280 according to an embodiment. The normal refinement process 280 can be implemented by a system 104, such as a meshing system as shown in FIG. 11. As illustrated in FIG. 2A, a prismatic polyhedral 281 may have an upper face 282 and a lower face 283, for example, as two base faces of the prismatic polyhedral 281. The upper 282 and lower 283 faces of the prismatic polyhedral 281 may have the same number of nodes. For example, each base face of the prismatic polyhedral 281 has 6 nodes. The upper 282 and lower 283 faces may be connected via side faces (e.g., 284, 285). A prismatic polyhedral cell can belong to a subset of polyhedral cells.

Refinement of mesh elements like edges, faces, and cells may typically involve the introduction of a new node that may be located on or within the element. For example, a common choice for edge refinement may be a new node located at the center of the edge, but any location along the edge would also suffice. Likewise, for faces and cells, a common choice for the new node may be the centroid, but any location within the element would be acceptable. For the purposes of discussion, the terms "mid-edge node", "mid-face node", and "mid-cell node" will be used with the understanding that the coordinates of the new node can be defined in a flexible manner. For example, a location of a new node (e.g., mid-edge node) on an edge can be introduced by splitting the edge based on a predetermined ratio (for example, 2:1 ratio). That is, the location of the new node (e.g., mid-edge node) can be defined by the location on which the edge is split based on the predetermined ratio.

Referring back to FIG. 2A, for example, a mid-face node can be represented by a node 286 positioned at a center of the upper face 282. A mid edge-node, for example, can be represented by a node 287. Nodes 288, 289, 290, 291, and 292 can also represent the mid-edge node. A mid-cell node can be defined at an appropriate location within the polyhedral cell being refined. The mid-cell node can also be located at the centroid of the cell being refined. For example, a node 516 (see FIG. 5A) can represent the mid-cell node of a cell 500.

For a refinement of a mesh cell, such as a polyhedral cell, a plurality of nodes can be defined for each parent face of the polyhedral cell. The plurality of nodes can include edge nodes, mid-edge nodes, and/or mid-face nodes which can be dependent upon whether the refinement is isotropic or anisotropic. For isotropic refinement, the defined plurality of nodes can include edge nodes, mid-edge nodes, mid-face nodes, and mid-cell nodes. Child face edges can be defined by connecting each mid-edge node to a mid-face node. For anisotropic refinement, the defined plurality of nodes can include edge nodes and mid-edge nodes. Child face edges can be defined by connecting two adjacent mid-edge nodes. The area enclosed by the child face edges can create a child face for both isotropic and anisotropic refinement. A plurality of child faces can be generated from the plurality of nodes. A plurality of child cells can be generated from the plurality of child faces. A polyhedral mesh with a plurality of refined polyhedral cells which includes the newly generated plurality of child cells can be optionally rendered on a display 180 (see FIG. 1B). A prismatic polyhedral 281 can be anisotropically refined normally (e.g. via a normal refinement) or tangentially (e.g. via a tangential refinement).

In a normal refinement of a prismatic polyhedral cell, such as prismatic polyhedral 281, a node 286 can be added at a center of the upper face 282 and the bottom face 283. A plurality of nodes can also be added at every edge (287, 288, 289, 290, 291, 292). The parent cell 281 can be split into 6 child cells (293, 294, 295, 296, 297, 298). In this manner, the prismatic polyhedral parent cell 281 can be reduced to 6 child cells instead of 12 child cells for isotropic refinement. This preferential mode splitting may avoid splitting in all directions, thereby reducing the number of cells in the refined mesh.

Figure 2B:
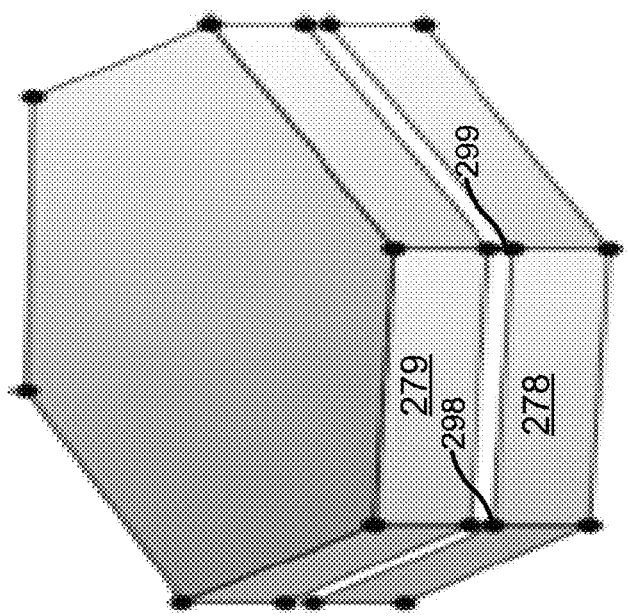
FIG. 2B shows an example diagram which illustrates one embodiment of tangential refinement according to one embodiment of the disclosure.
Figure 2B:
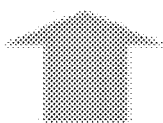
Figure 2B:
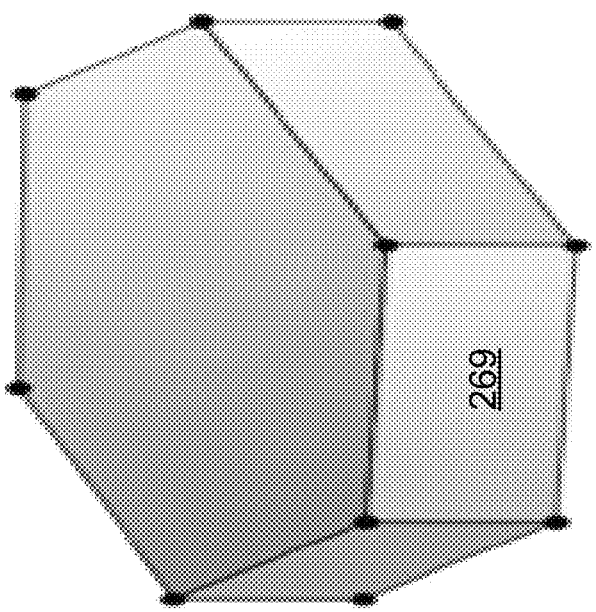

FIG. 2B shows an embodiment of a tangential refinement according to an embodiment. A plurality of nodes can be added onto edges. For example, nodes 298, 299 may be added on an edge. A parent cell 269 can be split into two child cells 278, 279. In some embodiment, part of a mesh can be refined by normal refinement stencil and part of the mesh can be refined by the tangential refinement stencil. This may provide a compatibility between an anisotropic and an isotropic mesh. For example, the normal refinement stencil can be identical to a stencil on a face on the polyhedral cell. This may create a compatibility between isotropic and anisotropic refinement at a boundary.

Figure 3:
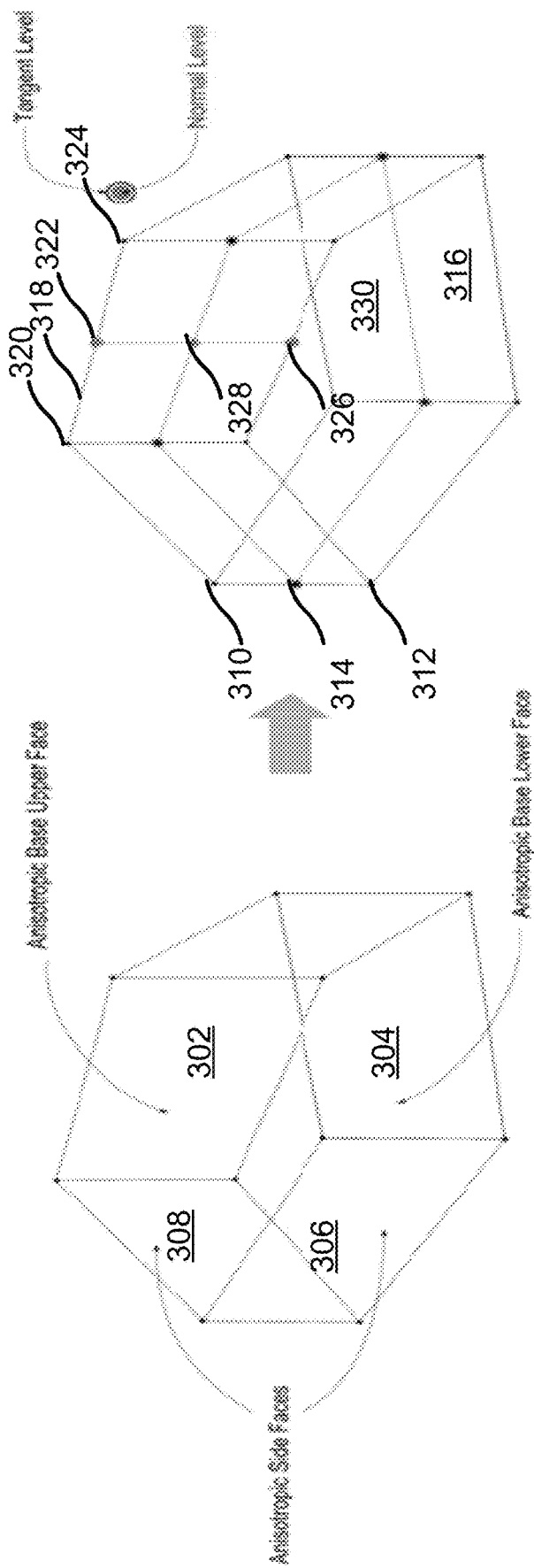
FIG. 3 shows an example diagram which illustrates anisotropic refinement according to one embodiment of the disclosure.

FIG. 3 shows an example of an embodiment of anisotropic refinement of a polyhedral cell according to an embodiment. The polygonal faces of a prismatic polyhedral cell can be classified into a base upper face 302, a base lower face 304, and a plurality of side faces 306, 308. Each face may be split into two child cells. For example, the cell may be split into two child cells 316, 330. A side face 318 may be split into 4 child cells if the polyhedral is to be interfaced to an isotropic polyhedral.

A refinement level can be a numerical value denoting the hierarchy of the refining process. This refinement level can determine the number of times the refinement algorithm is applied to a plurality of polyhedral cells. A user can define a refinement level through user input device 170 and/or via a graphical user interface. Refinement levels can be associated with mesh elements at nodes, faces, and/or cells. An unrefined polyhedral mesh can have a refinement level for the mesh elements initialized to zero.

For example, if a desired refinement level of two is set, refinement of a plurality of polyhedral cells will occur twice. The first time can occur as described in detail herein with respect to FIG. 3. After the first level of refinement, the refinement level for each node, face, and cell that was refined can be designated as an increment of the current refinement level. In this example, an unrefined face having a current face refinement level of zero will then be incremented by one. For each child face that has a corresponding refinement level of one, the refinement process can repeat. For example, after child face of FIG. 3, has been refined once, it can be refined a second time after the entire refinement step is complete. For the refinement, child face can be further split into child faces. The nodes, faces, and cells that had a second refinement can be incremented to have a refinement level of two. This process can continue until each of the selected cells have a refinement level that matches the user defined refinement level. A polyhedral mesh with a refined plurality of polyhedral cells can be optionally displayed on display 180 in between each refinement level. The polyhedral mesh can also be optionally displayed on display 180 once after the refinement has reached the defined refinement level.

The refinement level may represent a number associated with every vertex, face, or cell. For a completely unrefined mesh, zero level can be initialized at every face, node, and cell. Every time a node is added at a midpoint between two nodes, the refinement level is increased by 1. For example, nodes 310 and 312 are at refinement level 0, node 314 is at refinement level 1.

Depending on the splitting direction, a refinement level can be represented by a two-value entity (normal level for a normal refinement and tangential level for a tangential refinement). A node can have a normal level and a tangential level. For example, a tangential split is performed on an edge, increment tangential level by 1 but normal level to zero. In another example, an edge is split in normal direction, a normal level is increased by 1.

Edge nodes 310, 312, 314 can be defined at the intersection point of two adjacent edges of the parent face (e.g., 302). Edge-nodes belonging to parent face can have a corresponding refinement level of 0. Mid-edge nodes (e.g., 314) can be defined corresponding to the midpoint of two adjacent edge nodes. For example, mid-edge node 314 can be located at the midpoint of two adjacent edge face nodes 310, 312. As the defining of mid-edge nodes 314 occurs during a first refinement process these mid-edge nodes can have a corresponding refinement level of 1.

The number of child faces created as a result of anisotropic refinement can be independent of the number of edge nodes of the parent face. Edge nodes 310 and 320 can be defined at the points at which the edges of the parent face intersect. Mid-edge node 322 can be defined at the midpoint between two adjacent edge nodes. For example, mid-edge node 322 can be defined at the midpoint of adjacent edge nodes 320, 324. A child face edge can be defined by connecting adjacent mid-edge nodes 322, 328, 326. The defining of a mid-face node can be skipped during anisotropic refinement, thus resulting in two corresponding child faces.

Figure 4:
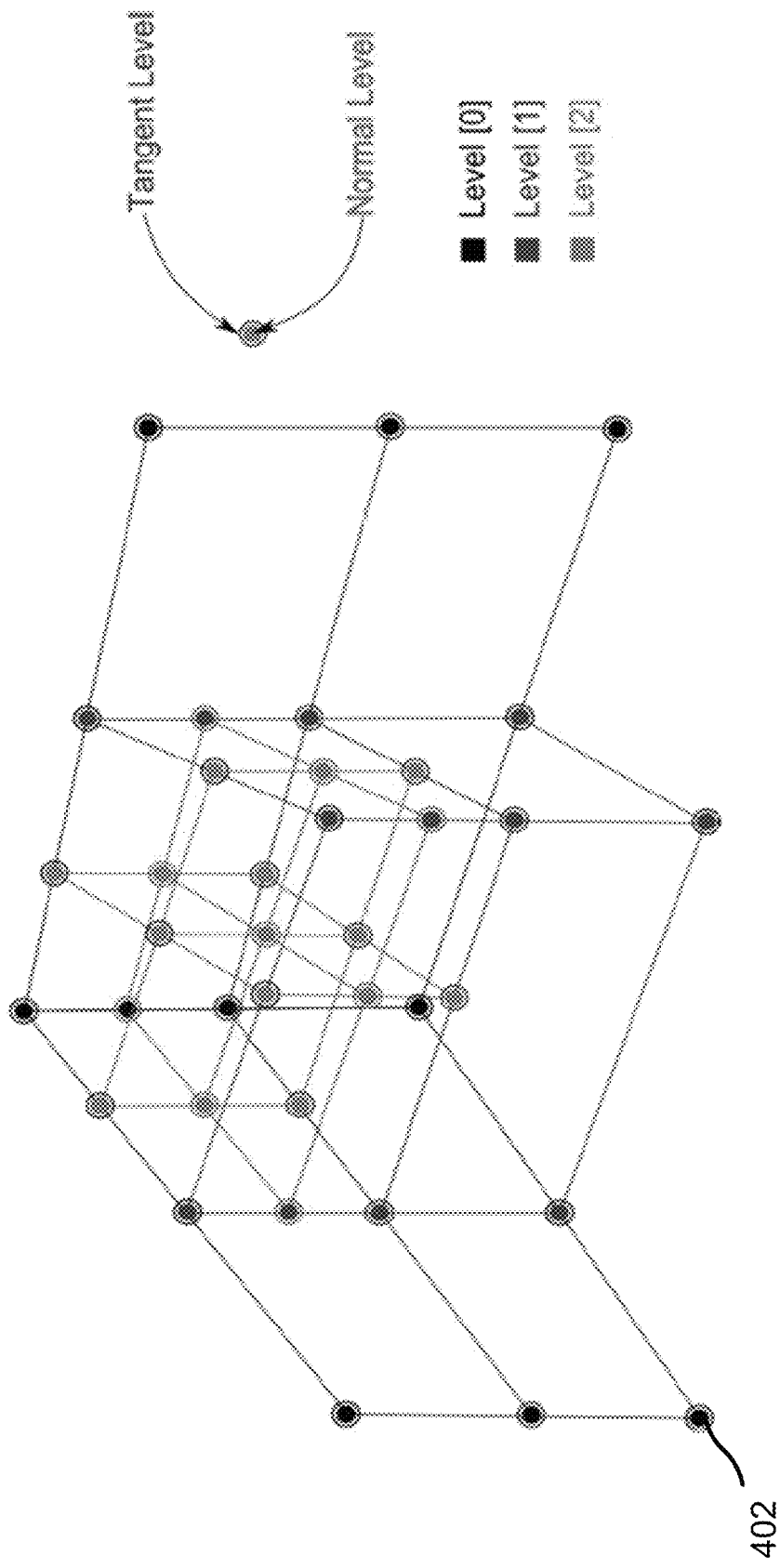
FIG. 4 shows an example diagram which illustrates anisotropic refinement level according to one embodiment of the disclosure.

FIG. 4 illustrates an example of refinement level according to an embodiment. A refinement level may represent a number associated with every vertex face of a cell. For example, an unrefined mesh may be represented by zero level 402. Each time a node is added at a midpoint between two nodes, the refinement level may be increased by 1. Two refinement levels can be stored per face or per cell or per node. For example, the two refinement levels may represent normal level and tangential level. Every time a split is performed in certain direction (normal or tangential), a refinement level may be increased by 1 based on the direction of the refinement.

Figure 5A:
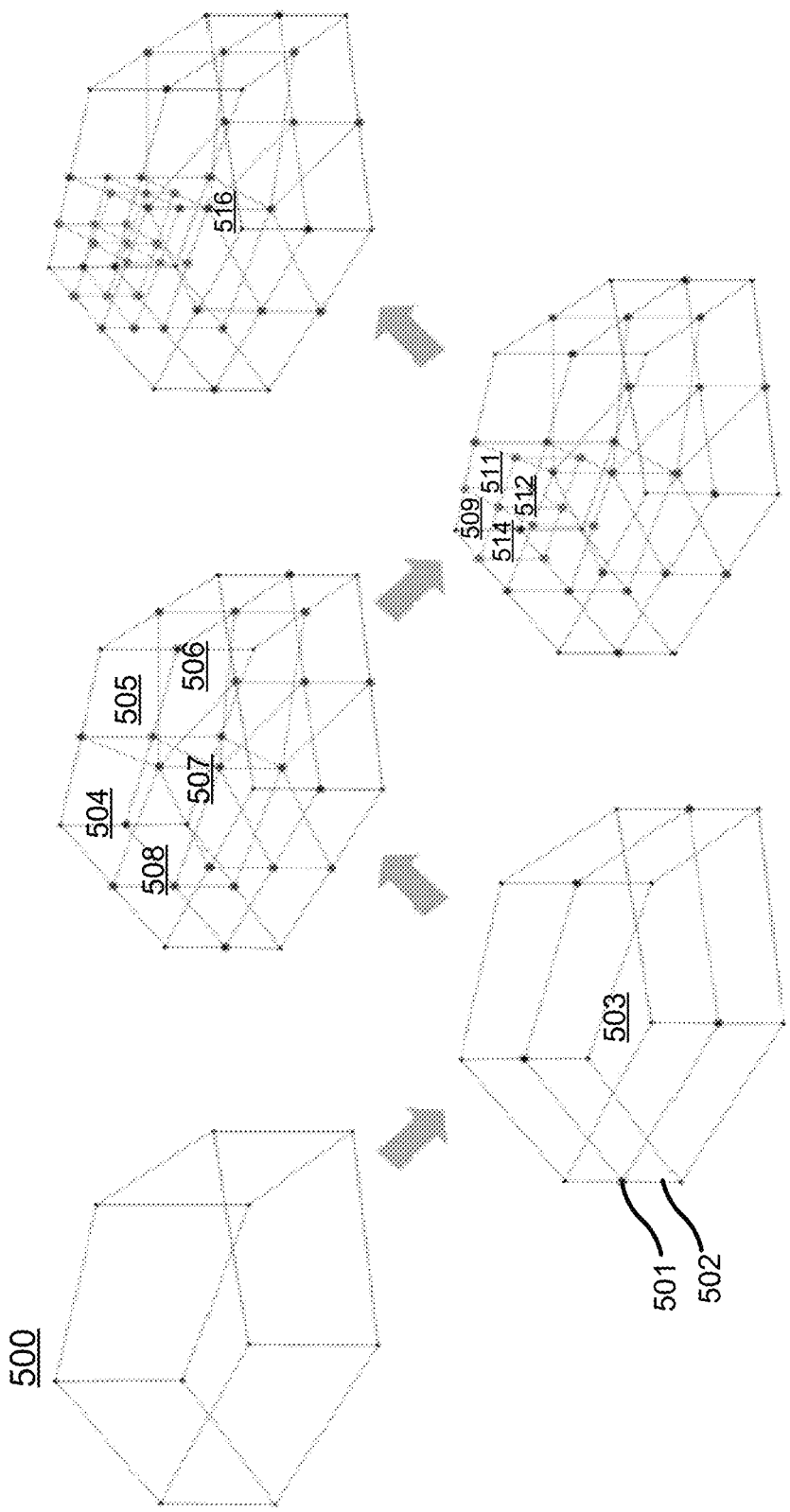
FIG. 5A shows an example diagram which illustrates a sequence of anisotropic and isotropic refinements according to one embodiment of the disclosure.

FIG. 5A illustrates a sequence of anisotropic and isotropic refinement process for a cell according to an embodiment. An unrefined cell 500 may be refined in a tangential direction in which nodes may be added on each side edge. For example, node 501 may be added on an edge 502. An interior face 503 may be introduced and split into two child cells. The upper and bottom child cells may be generated as a split of the parent cell in a tangent direction. The upper child cells may be normally split into 5 cells (504, 505, 506, 507, 508) for every parent node of the upper or lower base face. Similarly, the lower child cell may be split into 5 cells. The anisotropic refinement in the tangential and normal directions as above may generate an isotropic refinement to the unrefined cell 500. Next, a child cell may be considered and the child cell may be split in the normal direction. As a result, 4 child cells (509, 511, 512, 514) may be generated based on 8 nodes. Each of the 4 generated child cells may be split in the tangential direction. The tangential direction of the 4 generated child cells may result in an isotropic refinement of the cell 504. Isotropic refinement may be generated after the tangential and normal refinement processes.

Figure 5B:
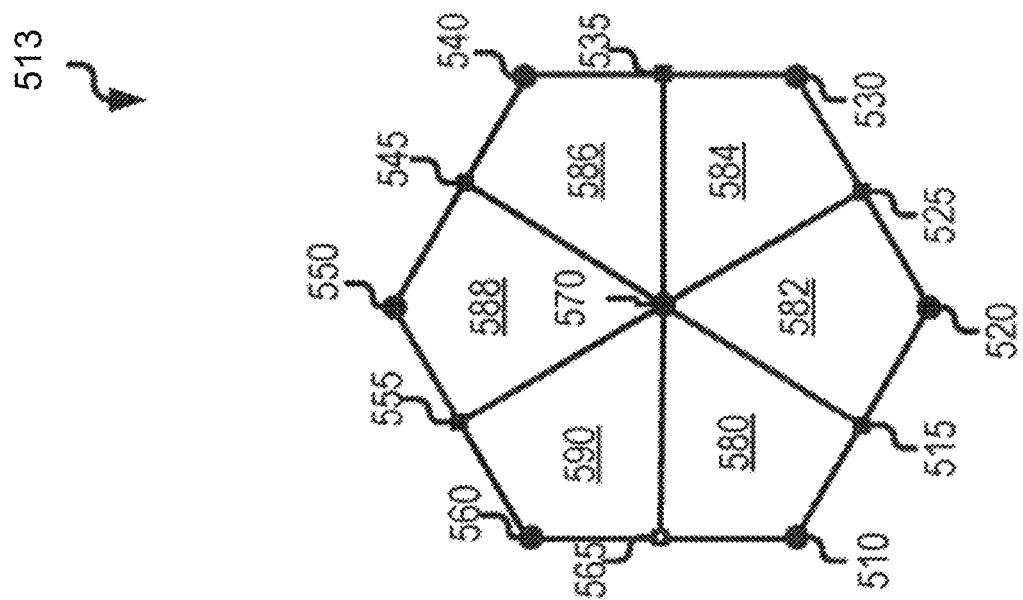
FIG. 5B is a diagrammatic depiction of a once isotropically refined polyhedral parent face according to one embodiment of the disclosure.

FIG. 5B is a diagrammatic depiction of a once isotropically refined polyhedral parent face 513 according to one embodiment of the disclosure. Parent face 513 can be equivalent to a parent face of the identified polyhedral cell. Edge nodes 510, 520, 530, 540, 550, and 560 can be defined at the intersection point of two adjacent edges of the parent face 513. Edge-nodes 510, 520, 530, 540, 550, and 560 belonging to parent face 513 can have a corresponding refinement level of 0. Mid-edge nodes 515, 525, 535, 545, 555, 565 can be defined corresponding to the midpoint of two adjacent edge nodes. For example, mid-edge node 515 can be located at the midpoint of two adjacent edge face nodes 510, 520. Mid-edge nodes can be enumerated in a counterclockwise order. The newly defined mid-edge nodes can be mapped to an edge node array, M{e:v}, which can return a node for every edge in the polyhedra mesh. As the defining of mid-edge nodes 515, 525, 535, 545, 555, and 565 occurs during a first refinement process these mid-edge nodes can have a corresponding increase of refinement level of 1.

For isotropic refinement, mid-face node 570 can be defined inside parent face 513. Mid-face node 570 can be located at the centroid of parent face 513. Alternatively, mid-face node 570 can be placed in a convenient location that can be altered based on the requirements of desired mesh quality after refinement. The positioning of mid-face node 570 can be such that child faces and child cells resulting from the refinement process are not inverted. In other words, the child faces and child cells resulting from refinement based on the positioning of mid-face 570 do not have negative face area or cell volume. Mesh quality can be largely defined by the requirements of an underlying discretization method. For example, in a finite volume paradigm, the parent face normal of a resulting child face can be closely aligned with the line connecting adjacent cell centroids. Mid-face node 570 can be mapped to an array of mid-face nodes, M{f:v}, which returns a node for every face in the polyhedra mesh. Mid-face node 570 can have a refinement level of 1.

A plurality of child faces 580, 582, 584, 586, 588, 590 can be generated by defining child edges radially extending from mid-face node 570 to each of mid-edge nodes 515, 525, 535, 545, 555, 565. When isotropically refined, the number of child faces can correspond to the number of edge nodes of the parent face. For example, parent face 513 is a hexagon having six edges with six defined edge nodes 510, 520, 530, 540, 550, and 560. As a result, six child faces 580, 582, 584, 586, 588, 590 are created. This refining can occur for all parent faces corresponding to each identified polyhedral cell within the polyhedra mesh.

Figure 5C:
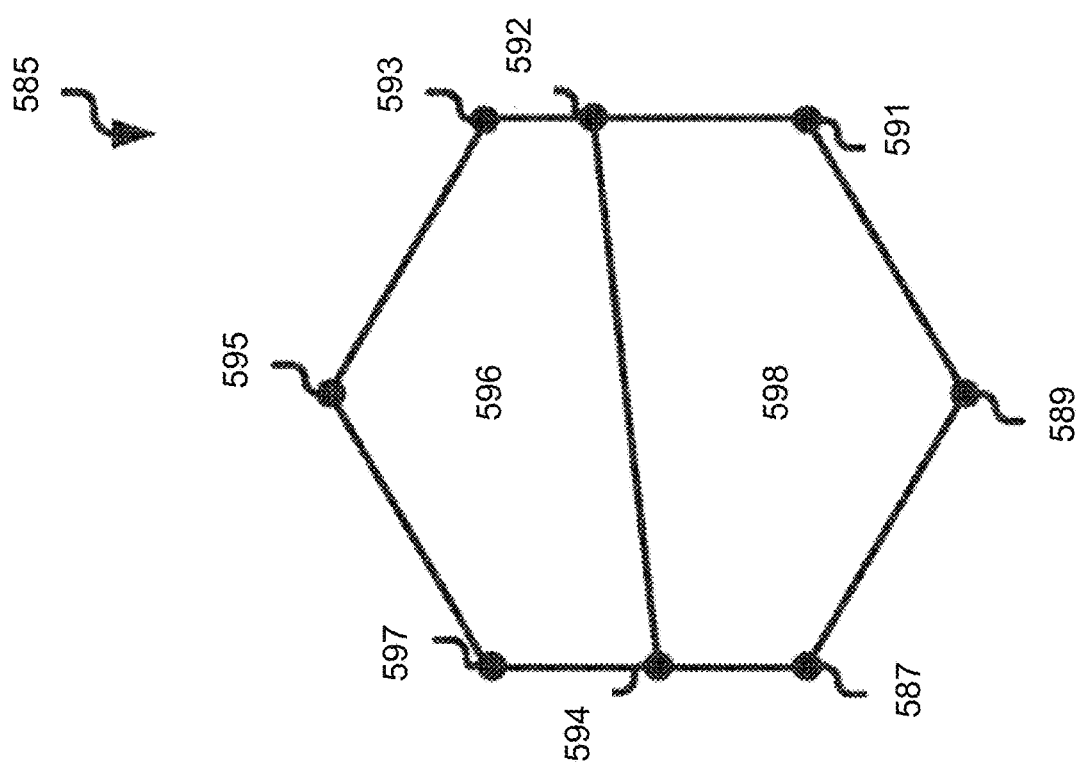
FIG. 5C is a diagrammatic depiction of a parent face once anisotropically refined polyhedral parent face according to one embodiment of the disclosure.

Parent faces can also be anisotropically refined. FIG. 5C is a diagrammatic depiction of a once anisotropically refined parent face 585 according to one embodiment of the disclosure. The number of child faces created as a result of anisotropic refinement can be independent of the number of edge nodes of the parent face. Edge nodes 587, 589, 591, 593, 595, and 597 can be defined at the points at which the edges of the parent face intersect. Mid-edge nodes 592, 594 can be defined at an in-between point or a midpoint between two adjacent edge nodes. For example, mid-edge node 592 can be defined in-between adjacent edge nodes 591, 593. A child face edge can be defined by connecting adjacent mid-edge nodes 592, 594. The defining of a mid-face node can be skipped when during anisotropic refinement. Thus resulting in two corresponding child faces 596, 598.

Figure 6:
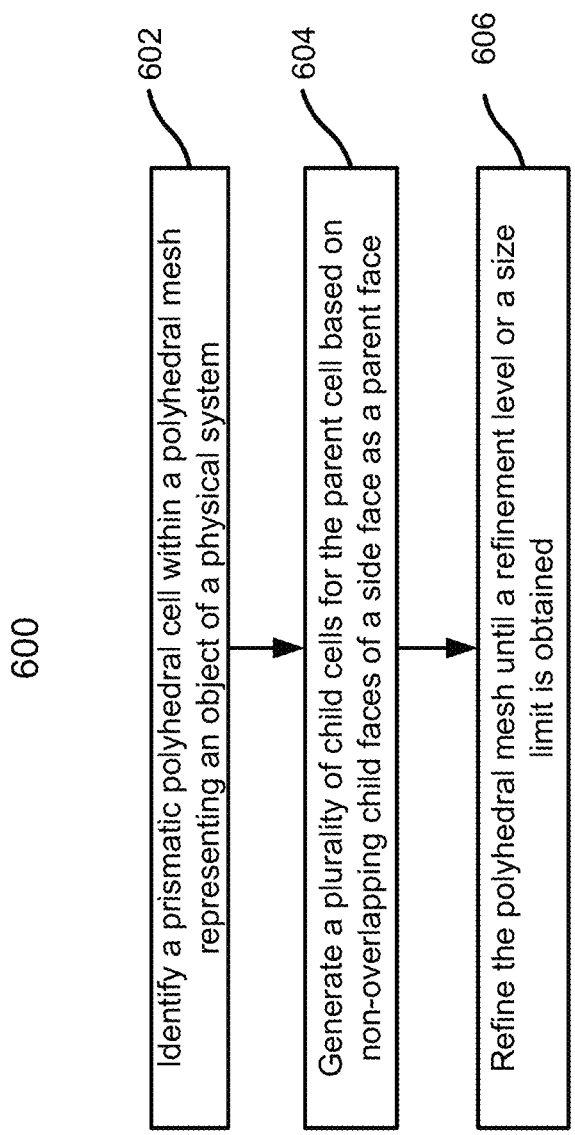
FIG. 6 shows a flowchart which illustrates anisotropic refinement operation according to one embodiment of the disclosure.

FIG. 6 represents an overview of a computer-implemented method 600 for an anisotropic refinement according to one embodiment. In operation 602, a data processing system, such as the data processing system shown in FIG. 11, can identify a prismatic polyhedral cell as a parent cell within a polyhedral mesh representing an object of a physical system. The prismatic polyhedral cell may have two base faces and a plurality of side faces joining the two base faces. The prismatic polyhedral cell may have a side face joining the two base faces via two base edges. The side face may join neighboring two of the side faces via two side edges. In operation 604, the data processing system can generate a plurality of child cells for the parent cell based on non-overlapping child faces of a side face or base face as a parent face. A pair of mid-edge nodes for the side face may be connected anisotropically for a child face edge of the non-overlapping child faces. The pair of mid-edge nodes may be connected between the two base edges or between the two side edges. In operation 606, the data processing system can refine the polyhedral mesh until a refinement level or a size limit is obtained. For example, predetermined stopping criteria (e.g., a user-specified maximum refinement level or a minimum size limit) may be specified to indicate when an iteration of a refinement process may be terminated. The size limit may include a length of an edge or a cell volume. Therefore, the refinement process may be terminated when the size limit has been reached. Similarly, the refinement process may be terminated when the refinement level has been obtained. The refining of the polyhedral mesh may include the identification of the prismatic polyhedral cell and the generation of the plurality of child cells. The refinement can be locally over a selected region or globally of the polyhedral mesh. This selection can be done through user selection via a user input device 170 and/or via a graphical user interface. Polyhedral cells can be identified within the polyhedral mesh. This can be done using a marking algorithm that would also be used with standard elements. The identified polyhedral cell can be decomposed by extracting polygon parent faces belonging to each identified individual polyhedral cell.

In one embodiment, the plurality of polyhedral cells can be identified based on a user input of a selection via a graphical user interface. Alternatively, the plurality of polyhedral cells can be identified based on marking algorithms within at least one data processor. A plurality of parent faces having a plurality of parent face edges may be extracted for each polyhedral cell within the polyhedra mesh. For each parent face, a plurality of nodes may be defined and connected either isotropically or anisotropically. A plurality of non-overlapping child faces may be generated with a perimeter defined by a combination of parent face edges and child face edges. A plurality of child cells may be generated from the connection of child faces of the plurality of non-overlapping child faces. Subsequent to being refined, the plurality of polyhedral cells can be coarsened. The refinement process can be repeated corresponding to a refinement level. Alternatively, the refinement process can be repeated corresponding to a defined maximum refinement level or minimum cell volume.

For isotopic refinement, a plural of edge nodes can be defined. Each edge node can be located at an intersection point of two adjacent parent face edges. A plurality of mid-edge nodes can also be defined. Each mid-edge node can be located at a midpoint of two adjacent edge nodes of the parent face. The number of edges of the parent face can correspond to the plurality of mid-edge nodes. A mid-face node can be defined at the centroid of a base face. Alternatively, a mid-face node can be defined at a location based upon a desired refinement quality.

For anisotropic refinement, a plurality of edge nodes can be such that an edge node can be located at an intersection point of two adjacent parent face edges. At least two mid-edge nodes can be defined. Each mid-edge node can be located at a midpoint of two adjacent edge nodes of the parent face. The two adjacent mid-edge nodes can be connected to create a child face edge. A plurality of nodes can include the plurality of edge nodes and the at least two mid-edge nodes.

In another embodiment, a plurality of polyhedral cells can be identified within a polyhedra mesh. The plurality of polyhedral cells can be identified based on a user input of a selection via a graphical user interface. Alternatively, the plurality of polyhedral cells can be identified based on adaptation algorithms within at least one data processor. For each polyhedral cell, a plurality of parent cells can be extracted. A plurality of parent faces belonging to a common refinement level can be identified. Each parent face has a plurality of child cells with a plurality of child faces. The plurality of child faces can be simultaneously agglomerated into each respective parent face. The plurality of child cells belonging to each parent cell can be agglomerated into each respective parent cell. A coarsened polyhedra mesh may be generated from the agglomerated parent faces. The coarsening process can be repeated corresponding to a refinement level. Alternatively, the coarsening process can be repeated corresponding to a defined maximum refinement level or minimum cell size.

In one embodiment, the pair of mid-edge nodes may be defined based on mid-edge node locations of the side edges or mid-edge node locations of the base edges. A connection of the mid-edge node locations of the side edges and the mid-edge node locations of the base edges may correspond to an isotropic refinement of the prismatic polyhedral cell.

Figure 7:
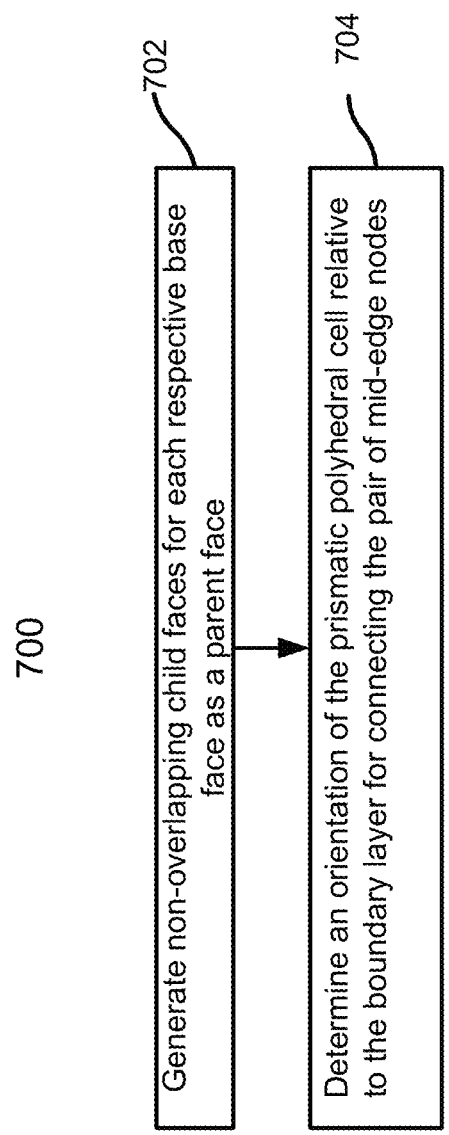
FIG. 7 is a flowchart which illustrates an example operation of generating a plurality of child cells according to one embodiment of the disclosure.

FIG. 7 represents an overview of a computer-implemented method 700 for generating the plurality of child cells according to one embodiment. In operation 702, the data processing system may generate non-overlapping child faces for each respective base face as a parent face. A plurality of mid-edge nodes and a mid-face node for the respective base face may be connected isotropically for a plurality of non-overlapping child faces of the respective base face. The plurality of child cells may be generated based on the non-overlapping child faces of the respective base face. In operation 704, the data processing system may determine an orientation of the prismatic polyhedral cell relative to the boundary layer for connecting the pair of mid-edge nodes.

In one embodiment, the pair of mid-edge nodes may be connected between the two side edges. The two base faces may be shared respectively by two of the plurality of child cells.

In one embodiment, the plurality of child cells and the parent cell may be related according to a cell hierarchy. The refinement may be repeated for at least two consecutive levels of the cell hierarchy.

In one embodiment, the prismatic polyhedral cell may belong to a boundary layer of the polyhedral mesh.

In one embodiment, the identification may be based on a user input indicating the boundary layer of the polyhedral mesh via a graphic user interface.

In one embodiment, the pair of mid-edge nodes may be connected between the base edges if the orientation indicates the base faces of the prismatic polyhedral cell and the boundary layer are substantially normally aligned.

In one embodiment, the data processing system may perform a simulation using the refined polyhedral mesh.

Figure 8:
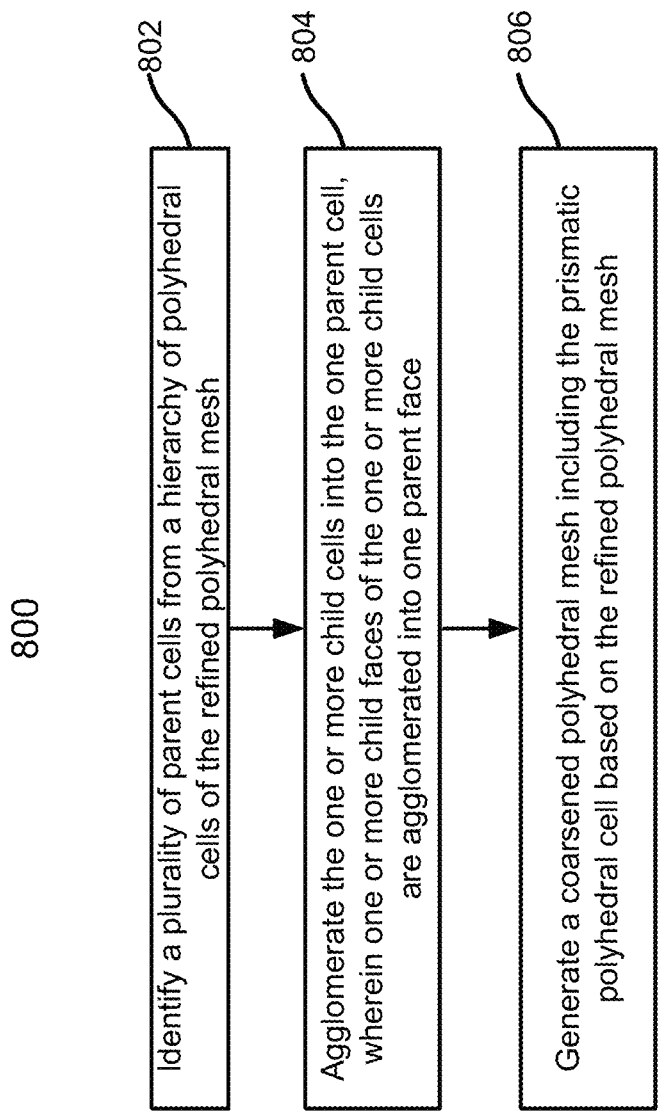
FIG. 8 is a flowchart which illustrates a coarsening operation according to one embodiment of the disclosure.

FIG. 8 represents an overview of a computer-implemented method 800 for a coarsening operation according to one embodiment. In operation 802, the data processing system may identify a plurality of parent cells from a hierarchy of polyhedral cells of the refined polyhedral mesh. The plurality of parent cells may be of a common level within the hierarchy. One of the plurality of parent cells may have one or more child cells within the hierarchy of polyhedral cells. The plurality of parent cells may include the two base faces and the plurality of side faces. In operation 804, the data processing system may also agglomerate the one or more child cells into the one parent face. The prismatic polyhedral cell with the plurality of parent cells may correspond to the parent cell of the one or more child cells. The one or more child faces of the one or more child cells may be agglomerated into one parent face. The prismatic polyhedral cell with the plurality of parent faces may correspond to the parent cell of the one or more child cells. In operation 806, the data processing system may additionally generate a coarsened polyhedral mesh including the prismatic polyhedral cell based on the refined polyhedral mesh.

The agglomeration can include removing all edge nodes of each child face of the plurality of child faces. All mid-edge nodes and a mid-face node of the parent face can be removed. The polyhedra mesh can be initiated for display by at least one data processor in a graphical user interface. The coarsened polyhedra mesh can be initiated for rendering by at least one data processor in the graphical user interface.

The agglomeration of child cells can occur by looping over all of the faces of the cell being refined and identifying child faces in the cells of the polyhedral mesh. Typically, these child cells may be removed first and the remaining child faces may be removed afterwards. In another embodiment, these child faces can be removed first from the polyhedra mesh. Mid-edge nodes and mid-face nodes common to all child faces of a, e.g. previously refined, parent cell can also be removed. All remaining child faces can be added to the parent cell and thus the child cells can be deleted from the polyhedra mesh. The parent cell can be marked for additional checking in a subsequent step to determine if some/all of its faces need to be agglomerated, in addition to the possible removal of extra mid-edge nodes.

The agglomeration of child faces can also occur by looping through all of the new parent faces made during the refinement process. Faces that point to the same cell on each side can be identified. These faces can be added to a temporary list, Fparent. If the temporary list, Fparent, has a size greater than one, then a new parent face having nodes of all child faced in Fparent can be configured. With all of the newly defined parent faces marked for additional checking. The mid-face node common to all child faces can be removed by looping over cells within the polyhedra mesh and counting the number of times each node is touched by a cell. A counter can be checked for all nodes in the polyhedral mesh. If the counter value is equal to one, then the node may no longer be required and can be removed from the mesh.

Figure 9:
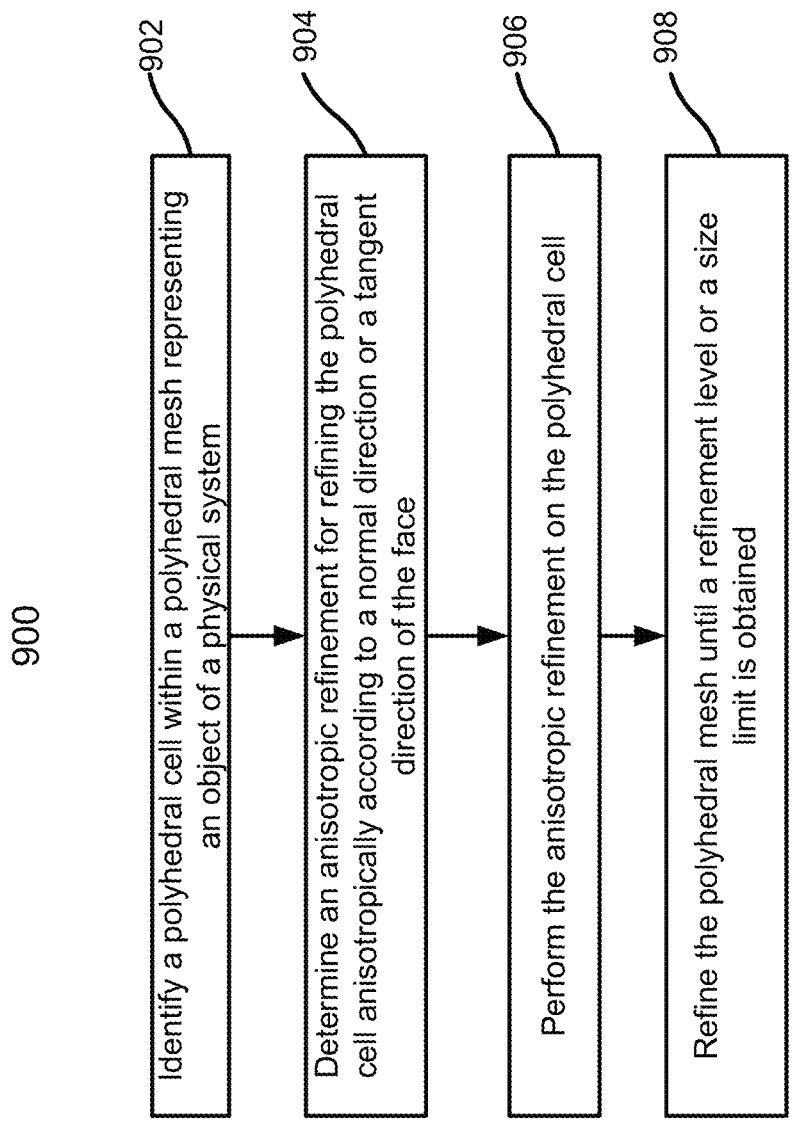
FIG. 9 is a flowchart which illustrates anisotropic refinement operation according to one embodiment of the disclosure.

FIG. 9 represents an overview of a computer-implemented method 900 an anisotropic refinement operation according to one embodiment. In operation 902, a data processing system may identify a polyhedral cell within a polyhedral mesh representing an object of a physical system. The polyhedral cell may have a face. A plurality of possible node locations in the polyhedral cell may correspond to an isotropic refinement of the polyhedral cell. In operation 904, the data processing system may determine an anisotropic refinement for refining the polyhedral cell anisotropically according to a normal direction or a tangent direction of the face. In operation 906, the data processing system may perform the anisotropic refinement on the polyhedral cell. Each node generated for performing the anisotropic refinement may be assigned with a separate one of the possible node locations corresponding to the isotropic refinement of the polyhedral cell. In operation 908, the data processing system may refine the polyhedral mesh until a refinement level or a size limit is obtained. For example, the size limit may include a mesh size. The refining the polyhedral mesh may include the determining the anisotropic refinement and the performing the anisotropic refinement.

In one embodiment, the polyhedral cell may include a base upper face, a base lower face, and a plurality of side faces. The base upper and lower faces may be connected via the plurality of side faces. The base upper and lower faces may have a same number of nodes.

In one embodiment, the data processing system may identify a mid-face node at a center of the base upper and lower faces of the face. The data processing system may also identify a plurality of normal mid-edge nodes on each edge of the base upper lower faces. The data processing system may generate a plurality of normal child faces by splitting the base upper and lower faces. Additionally, the data processing system may identify a plurality of tangential mid-edge nodes on each edge of the plurality of side faces. Further, the data processing system may generate a plurality of tangential child faces by splitting the plurality of side faces.

In one embodiment, the data processing system may initiate a refinement level to zero at every node on the polyhedral cell. Further, the data processing system may increment the refinement level each time a mid-edge node is added.

In one embodiment, the refinement level may include a normal and a tangential levels. The normal level may correspond to a refinement of the base upper and lower faces in the normal direction. The tangential level may correspond to a refinement of the plurality of side faces in the tangential direction.

In one embodiment, the data processing system may generate isotropic cells based on the plurality of normal child cells and the plurality of tangential child cells.

Figure 10:
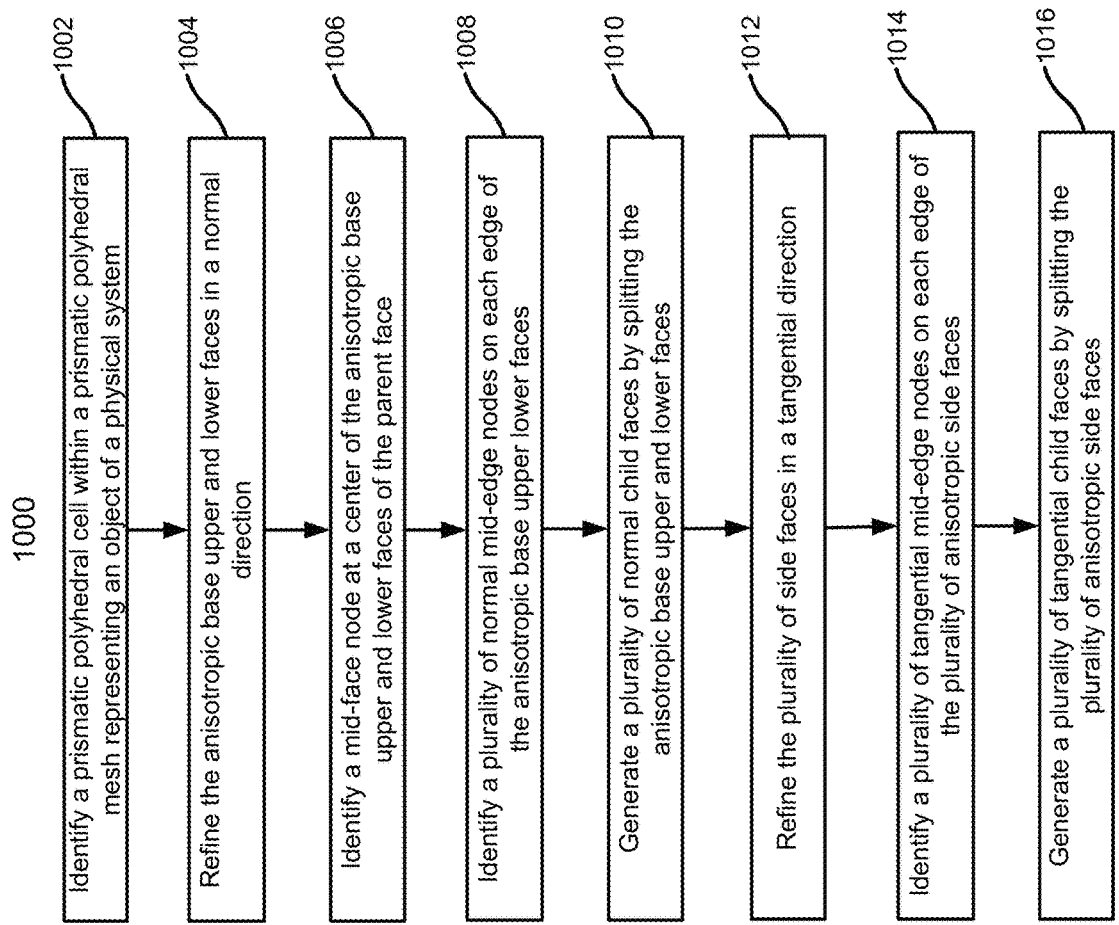
FIG. 10 is a flowchart which illustrates anisotropic refinement operation according to one embodiment of the disclosure.

FIG. 10 represents an overview of a computer-implemented method 1000 for an anisotropic refinement operation according to one embodiment. In operation 1002, a data processing system, such as the data processing system shown in FIG. 11, can identify a prismatic polyhedral cell within a prismatic polyhedral mesh representing an object of a physical system. The prismatic polyhedral cell may have a parent face with an anisotropic base upper face, an anisotropic base lower face, and a plurality of anisotropic side faces. The anisotropic base upper and lower faces may be connected via the plurality of anisotropic side faces. The anisotropic base upper and lower faces may have a same number of nodes. In operation 1004, the data processing system may refine the anisotropic base upper and lower faces in a normal direction. In operation 1006, the data processing system may identify a mid-face node at a center of the anisotropic base upper and lower faces of the parent face. In operation 1008, the data processing system may identify a plurality of normal mid-edge nodes on each edge of the anisotropic base upper lower faces. In operation 1010, the data processing system may generate a plurality of normal child faces by splitting the anisotropic base upper and lower face. In operation 1012, the data processing system may refine the plurality of side faces in a tangential direction. In operation 1014, the data processing system may identify a plurality of tangential mid-edge nodes on each edge of the plurality of anisotropic side faces. In operation 1016, the data processing system may generate a plurality of tangential child faces by splitting the plurality of anisotropic side faces.

A region of cell within the polyhedral mesh for refinement can be selected. The refinement can be locally over a selected region or globally of the polyhedral mesh. This selection can be done through user selection via a user input device 170 and/or via a graphical user interface. Polyhedral cells can be identified within the polyhedral mesh. This can be done using a marking algorithm that would also be used with standard elements. The identified polyhedral cell can be decomposed by extracting polygon parent faces belonging to each identified individual polyhedral cell.

In one embodiment, the data processing system may initiate a refinement level to zero at every node on the prismatic polyhedral cell. The data processing system may also increment the refinement level each time a mid-edge node is added. The refinement level may include a normal and a tangential levels, wherein the normal level may correspond to a refinement of the anisotropic base upper and lower faces in the normal direction, and wherein the tangential level may correspond to a refinement of the plurality of anisotropic side faces in the tangential direction.

In one embodiment, the data processing system may generate isotropic cells based on the plurality of normal child cells and the plurality of tangential child cells.

The methods and systems described herein may be implemented using any suitable processing system with any suitable combination of hardware, software and/or firmware, such as described below with reference to the non-limiting examples of FIGS. 11, 12A, 12B, and 12C.

FIG. 11 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 12A:
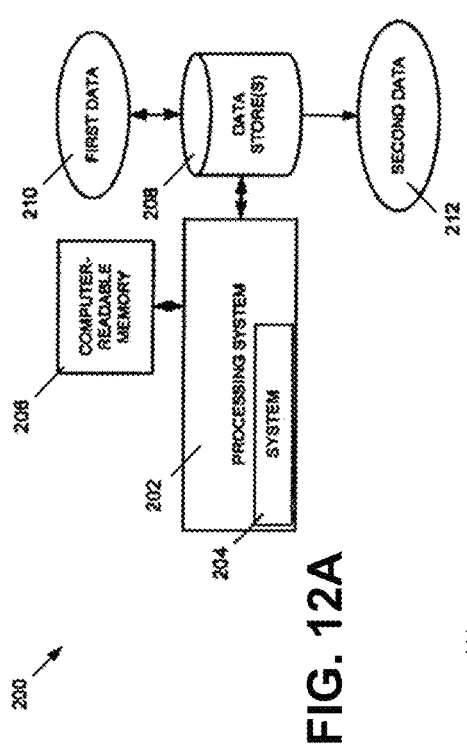
Figure 12B:
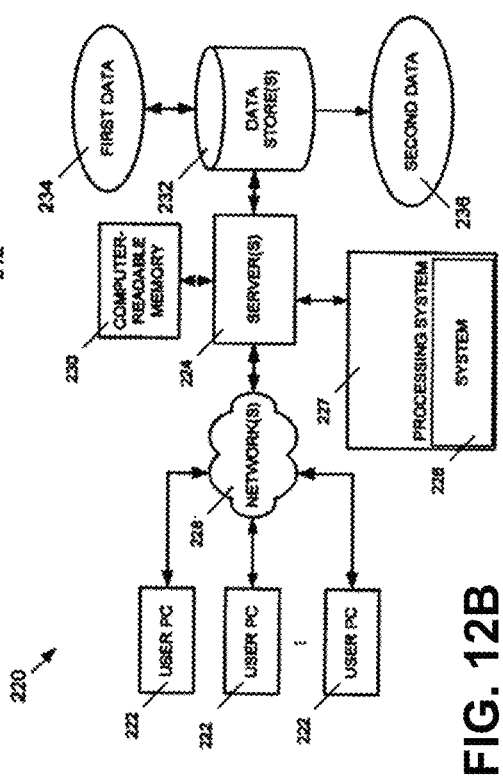
Figure 12C:
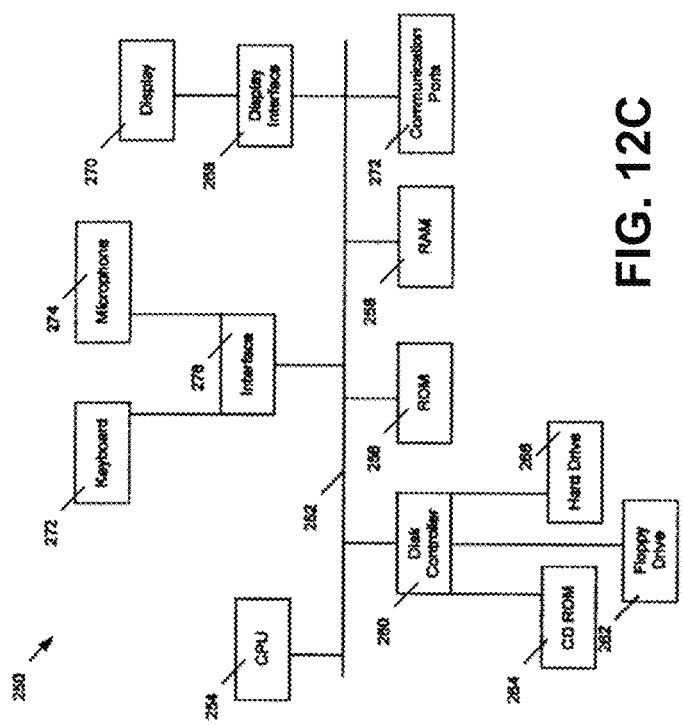

FIGS. 12A, 12B, and 12C depict example systems for use in implementing a system. For example, FIG. 12A depicts an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 12B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 12C shows a block diagram of exemplary hardware for a standalone computer architecture 250, such as the architecture depicted in FIG. 12A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
    identifying a prismatic polyhedral cell as a parent cell within a polyhedral mesh representing an object of a physical system, the prismatic polyhedral cell having two base faces and a plurality of side faces joining the two base faces, a side face joining the two base faces via two base edges, the side face joining neighboring two of the side faces via two side edges, the parent cell being of a level according to a cell hierarchy for the polyhedral mesh;
    performing one of an anisotropic normal refinement or an anisotropic tangent refinement on the parent cell to generate a plurality of child cells of a next level of the cell hierarchy for the parent cell, the anisotropic normal refinement to add a pair of mid-edge nodes for the side face are connected anisotropically between the two base edges of the parent face, the anisotropic tangent refinement to add a pair of mid-edge nodes connected anisotropically between the two side edges of the side face; and
    refining the polyhedral mesh until a refinement level of the cell hierarchy or a size limit is obtained, wherein the refining the polyhedral mesh includes iteration of the identification and performing one of the anisotropic normal refinement or the anisotropic tangent refinement selectively.

2. The medium as, in claim 1, wherein the pair of mid-edge nodes defined based on mid-edge node locations of the side edges or mid-edge node locations of the base edges, and wherein a connection of the mid-edge node locations of the side edges and the mid-edge node locations of the base edges corresponds to an isotropic refinement of the prismatic polyhedral cell.

3. The medium, as in claim 1, wherein the pair of mid-edge nodes are connected between the two base edges, and wherein the generation of the plurality of child cells comprises:
    generating non-overlapping child faces for each respective base face as a parent face, wherein a plurality of mid-edge nodes and a mid-face node for the respective base face are connected isotropically for a plurality of non-overlapping child faces of the respective base face, wherein the plurality of child cells are generated based on the non-overlapping child faces of the respective base face.

4. The medium, as in claim 1, wherein the pair of mid-edge nodes are connected between the two side edges, and wherein the two base faces are shared respectively by two of the plurality of child cells.

5. The medium, as in claim 4, wherein the plurality of child cells and the parent cell are related according to the cell hierarchy, and wherein the refinement is repeated for at least two consecutive levels of the cell hierarchy.

6. The medium, as in claim 1, wherein the prismatic polyhedral cell belongs to a boundary layer of the polyhedral mesh.

7. The medium, as in claim 6, wherein the identification is based on a user input indicating the boundary layer of the polyhedral mesh via a graphic user interface.

8. The medium, as in claim 6, wherein the generating the plurality of child cells comprises:
   determining an orientation of the prismatic polyhedral cell relative to the boundary layer for connecting the pair of mid-edge nodes.

9. The medium, as in claim 8, wherein the pair of mid-edge nodes are connected between the base edges if the orientation indicates the base faces of the prismatic polyhedral cell and the boundary layer are substantially normally aligned.

10. The medium, as in claim 1, the method further comprising:
    performing a simulation using the refined polyhedral mesh.

11. The medium, as in claim 1, the method further comprising:
    identifying a plurality of parent cells from a hierarchy of polyhedral cells of the refined polyhedral mesh, the plurality of parent cells being of a common level within the hierarchy, one of the plurality of parent cells having one or more child cells within the hierarchy of polyhedral cells, the plurality of parent cells including the two base faces and the plurality of side faces;
    agglomerating the one or more child cells into the one parent cell, the prismatic polyhedral cell with the plurality of parent cells corresponding to the parent cell of the one or more child cells, wherein the one or more child faces of the one or more child cells are agglomerated into the one parent face, the prismatic polyhedral cell with the plurality of parent faces corresponding to the parent cell of the one or more child cells; and
    generating a coarsened polyhedral mesh including the prismatic polyhedral cell based on the refined polyhedral mesh.

12. A non-transitory machine readable medium storing executable program instructions which when executed by a data processing system cause the data processing system to perform a method, the method comprising:
    identifying a polyhedral cell as a parent cell within a polyhedral mesh representing an object of a physical system, the polyhedral cell having a face, wherein a plurality of possible node locations in the polyhedral cell correspond to an isotropic refinement of the polyhedral cell, the parent cell being of a level according to a cell hierarchy for the polyhedral mesh;
    determining an anisotropic normal refinement for refining the polyhedral cell anisotropically according to a normal direction of the face;
    performing the anisotropic normal refinement on the polyhedral cell to generate a plurality of child cells of a next level of the cell hierarchy for the parent cell, wherein each node generated for performing the anisotropic refinement is assigned with a separate one of the possible node locations corresponding to the isotropic refinement of the polyhedral cell, and the anisotropic normal refinement to add a pair of mid-edge nodes connected anisotropically between two base edges of the parent face; and
    refining the polyhedral mesh until a refinement level of the cell hierarchy or a size limit is obtained, wherein the refining the polyhedral mesh includes iteration of the identifying, determining, and performing the anisotropic normal refinement selectively.

13. The medium as, in claim 12, wherein the polyhedral cell includes a base upper face, a base lower face, and a plurality of side faces, the base upper and lower faces being connected via the plurality of side faces, the base upper and lower faces having a same number of nodes.

14. The medium, as in claim 12, the method further comprising:
    identifying a mid-face node at a center of the base upper and lower faces of the face;
    identifying a plurality of normal mid-edge nodes on each edge of the base upper lower faces;
    generating a plurality of normal child cells by splitting the base upper and lower faces;
    identifying a plurality of tangential mid-edge nodes on each edge of the plurality of side faces; and
    generating a plurality of tangential child cells by splitting the plurality of side faces.

15. The medium, as in claim 14, the method further comprising:
    initiating a refinement level to zero at every node on the polyhedral cell; and
    incrementing the refinement level each time a mid-edge node is added.

16. The medium, as in claim 15, wherein the refinement level comprises a normal and a tangential levels, wherein the normal level corresponds to a refinement of the base upper and lower faces in the normal direction, and wherein the tangential level corresponds to a refinement of the plurality of side faces in the tangential direction.

17. The medium, as in claim 12, the method further comprising:
    generating isotropic cells based on the plurality of normal child cells and the plurality of tangential child cells.

18. A non-transitory machine readable medium storing executable program instructions which when executed by a data processing system cause the data processing system to perform a method, the method comprising:
    identifying a prismatic polyhedral cell as a parent cell within a prismatic polyhedral mesh representing an object of a physical system, the prismatic polyhedral cell having a parent face with an anisotropic base upper face, an anisotropic base lower face, and a plurality of anisotropic side faces, the anisotropic base upper and lower faces being connected via the plurality of anisotropic side faces, the anisotropic base upper and lower faces having a same number of nodes the parent cell being of a level according to a cell hierarchy for the prismatic polyhedral mesh;
    performing at least one of an anisotropic normal refinement or an anisotropic tangent refinement on the parent cell to generate a plurality of child cells of a next level of the cell hierarchy for the parent cell, comprising:
       anisotropically refining the anisotropic base upper and lower faces in a normal direction comprising:

identifying a mid-face node at a center of the anisotropic base upper and lower faces of the parent face, identifying a plurality of normal mid-edge nodes on each edge of the anisotropic base upper lower faces, and generating a plurality of normal child faces by splitting the anisotropic base upper and lower faces; and anisotropically refining the plurality of side faces in a tangential direction comprising:

identifying a plurality of tangential mid-edge nodes on each edge of the plurality of anisotropic side faces, and generating a plurality of tangential child faces by splitting the plurality of anisotropic side faces; and refining the prismatic polyhedral mesh until a refinement level of the cell hierarchy or a size limit is obtained, wherein the refining the prismatic polyhedral mesh includes iteration of the identification and performing at least one the anisotropic normal refinement or the anisotropic tangent refinement selectively.

19. The medium, as in claim 18, the method further comprising:

initiating a refinement level to zero at every node on the prismatic polyhedral cell; and incrementing the refinement level each time a mid-edge node is added.

20. The medium, as in claim 19, the method further comprising:

generating isotropic cells based on the plurality of normal child cells and the plurality of tangential child cells.

21. A method, comprising:

identifying a prismatic polyhedral cell as a parent cell within a polyhedral mesh representing an object of a physical system, the prismatic polyhedral cell having two base faces and a plurality of side faces joining the two base faces, a side face joining the two base faces via two base edges, the side face joining neighboring two of the side faces via two side edges, the parent cell being of a level according to a cell hierarchy for the polyhedral mesh;

performing one of an anisotropic normal refinement or an anisotropic tangent refinement on the parent cell to generate a plurality of child cells of a next level of the cell hierarchy for the parent cell, the anisotropic normal refinement to add a pair of mid-edge nodes for the side face are connected anisotropically between the two base edges of the parent face, the anisotropic tangent refinement to add a pair of mid-edge nodes connected anisotropically between the two side edges of the side face; and refining the polyhedral mesh until a refinement level of the cell hierarchy or a size limit is obtained, wherein the refining the polyhedral mesh includes iteration of the identification and performing one the anisotropic normal refinement or the anisotropic tangent refinement selectively.

22. The method as, in claim 21, wherein the pair of mid-edge nodes defined based on mid-edge node locations of the side edges or mid-edge node locations of the base edges, and wherein a connection of the mid-edge node locations of the side edges and the mid-edge node locations of the base edges corresponds to an isotropic refinement of the prismatic polyhedral cell.

23. The method, as in claim 21, wherein the pair of mid-edge nodes are connected between the two base edges, and wherein the generation of the plurality of child cells further comprises:

generating non-overlapping child faces for each respective base face as a parent face, wherein a plurality of mid-edge nodes and a mid-face node for the respective base face are connected isotropically for a plurality of non-overlapping child faces of the respective base face, wherein the plurality of child cells are generated based on the non-overlapping child faces of the respective base face.

24. The method, as in claim 21, wherein the pair of mid-edge nodes are connected between the two side edges, and wherein the two base faces are shared respectively by two of the plurality of child cells.

25. The method, as in claim 21, further comprising:

performing a simulation using the refined polyhedral mesh.

26. The method, as in claim 21, further comprising:

identifying a plurality of parent cells from a hierarchy of polyhedral cells of the refined polyhedral mesh, the plurality of parent cells being of a common level within the hierarchy, one of the plurality of parent cells having one or more child cells within the hierarchy of polyhedral cells, the plurality of parent cells including the two base faces and the plurality of side faces;

agglomerating the one or more child cells into the one parent cell, the prismatic polyhedral cell with the plurality of parent cells corresponding to the parent cell of the one or more child cells, wherein the one or more child faces of the one or more child cells are agglomerated into the one parent face, the prismatic polyhedral cell with the plurality of parent faces corresponding to the parent cell of the one or more child cells; and generating a coarsened polyhedral mesh including the prismatic polyhedral cell based on the refined polyhedral mesh.

27. A system, comprising:

a memory; and a processor coupled with the memory configured to:

identify a prismatic polyhedral cell as a parent cell within a polyhedral mesh representing an object of a physical system, the prismatic polyhedral cell having two base faces and a plurality of side faces joining the two base faces, a side face joining the two base faces via two base edges, the side face joining neighboring two of the side faces via two side edges, the parent cell being of a level according to a cell hierarchy for the polyhedral mesh, performing one of an anisotropic normal refinement or an anisotropic tangent refinement on the parent cell to generate a plurality of child cells of a next level of the cell hierarchy for the parent cell, the anisotropic normal refinement to add a pair of mid-edge nodes connected anisotropically between the two base edges of the parent face, the anisotropic tangent refinement to add a pair of mid-edge nodes connected anisotropically between the two side edges of the side face, and refine the polyhedral mesh until a refinement level of the cell hierarchy or a size limit is obtained, wherein the refining the polyhedral mesh includes iteration of the identification and performance of one the anisotropic normal refinement or the anisotropic tangent refinement selectively.

28. The system of claim 27, wherein the pair of mid-edge nodes defined based on mid-edge node locations of the side edges or mid-edge node locations of the base edges, and wherein a connection of the mid-edge node locations of the side edges and the mid-edge node locations of the base edges corresponds to an isotropic refinement of the prismatic polyhedral cell.

29. The system of claim 27, wherein the pair of mid-edge nodes are connected between the two base edges, and wherein the processor configured to generate the plurality of child cells further comprises the processor configured to:
generate non-overlapping child faces for each respective base face as a parent face, wherein a plurality of mid-edge nodes and a mid-face node for the respective base face are connected isotropically for a plurality of non-overlapping child faces of the respective base face, wherein the plurality of child cells are generated based on the non-overlapping child faces of the respective base face.

\* \* \* \* \*